United States Patent [19]

Okuda

[11] Patent Number: 4,662,564

[45] Date of Patent: May 5, 1987

[54] FUEL INJECTION NOZZLE WITH TIMING SENSOR

[75] Inventor: Shinji Okuda, Higashimatsuyama, Japan

[73] Assignee: Diesel Kiki Co., Ltd., Tokyo, Japan

[21] Appl. No.: 727,878

[22] Filed: Apr. 26, 1985

[30] Foreign Application Priority Data

May 15, 1984 [JP] Japan ............................ 59-69831[U]
May 29, 1984 [JP] Japan ............................ 59-78112[U]

[51] Int. Cl.[4] ...................... B67D 5/08; F02M 39/00; G01M 15/00

[52] U.S. Cl. ................................. 239/73; 239/533.3; 73/119 A

[58] Field of Search .................. 73/119 A; 239/397.5, 239/453, 533.2–533.12, 73

[56] References Cited

U.S. PATENT DOCUMENTS

| | | | |
|---|---|---|---|
| 3,596,507 | 8/1971 | Oshima | 73/119 A |
| 4,109,518 | 8/1978 | Dooley et al. | 73/119 A |
| 4,181,010 | 1/1980 | Knape et al. | 73/119 A |
| 4,183,467 | 1/1980 | Sheraton et al. | 239/73 |
| 4,398,670 | 8/1983 | Hofmann | 239/533.9 |

FOREIGN PATENT DOCUMENTS

| | | | |
|---|---|---|---|
| 55-50188 | 12/1980 | Japan . | |
| 56-113044 | 9/1981 | Japan . | |
| 2069599 | 8/1981 | United Kingdom . | |
| 182356 | 11/1966 | U.S.S.R. | 73/119 A |

*Primary Examiner*—Joseph F. Peters, Jr.
*Assistant Examiner*—Mary Beth O. Jones
*Attorney, Agent, or Firm*—Wenderoth, Lind & Ponack

[57] ABSTRACT

A fuel injection nozzle for injecting fuel into a diesel engine includes a nozzle holder having a hole defined therein in a direction transverse to the axis of the nozzle holder and opening into a spring chamber defined in the nozzle holder. An insulating member is fitted in the hole in a fluid-tight manner. In the spring chamber, there are disposed a spring seat remotely from a needle valve and supporting a spring for applying a spring force to close the needle valve, and a conductive body extending through the insulating member in a fluid-tight manner and having an end positioned between the spring seat and an inner wall surface of the nozzle holder. A pressure-sensitive element is fixed to the end of the conductive body and is actuated in response to the spring force applied thereto through the spring seat for producing an output signal which is fed out through the conductive body to thereby detect the timing of opening of the fuel injection nozzle. Alternatively, the electric resistance between the needle valve and the nozzle holder is detected through the conductive body to detect the timing of opening of the fuel injection nozzle.

4 Claims, 5 Drawing Figures

FUEL INJECTION NOZZLE WITH TIMING SENSOR

BACKGROUND OF THE INVENTION

The present invention relates to a fuel injection nozzle for use in a diesel engine, the fuel injection nozzle having a timing sensor for electrically detecting the timing of injection of fuel into the diesel engine based on operation of the fuel injection nozzle.

There are known fuel injection nozzles for use in diesel engines, having a pressure sensor mounted in a nozzle holder for detecting the pressure from a needle valve when it is opened for fuel injection. The timing of fuel injection can be detected by detecting an output signal from the pressure sensor. Another known timing sensor is arranged to detect the timing of fuel injection by detecting an electric resistance between the needle valve and the nozzle holder.

One example of such a pressure sensor comprises a piezoelectric element as disclosed in Japanese Laid-Open patent Publication No. 56-113044 published on Sept. 5, 1981. According to the disclosed arrangement, a terminal rod made of an electrically conductive material is supported, with an oil seal and electric insulation, in a nozzle holder end remote from the needle valve in the fuel injection nozzle. When the needle valve is lifted off its seat, it applies a pressure to the piezoelectric element which then issues an output signal through the terminal rod. The piezoelectric element is grounded through a circular grounding plate having on its outer peripheral edge a plurality of teeth or projections angularly spaced at equal intervals and projecting radially outwardly into contact with the inner wall surface of a spring chamber defined in the nozzle holder. The teeth of the grounding plate are held in resilient engagement with the nozzle holder for grounding the piezoelectric element. The grounding plate is interposed between the piezoelectric element and the upper end surface of a spring disposed in the spring chamber.

A timing sensor which detects the electric resistance between the needle valve and the nozzle holder is revealed in Japanese patent Publication No. 55-50188, for example, published on Dec. 16, 1980. Electric switching effected between the needle valve and the nozzle holder when the needle valve is opened and closed results in different electric resistances on opening and closing of the needle valve. An electrically insulating plate and an electrically conductive contact plate are disposed between a spring seat and the nozzle holder, with a lead wire extending from the contact plate for detecting the electric resistance.

The piezoelectric pressure sensor is tedious and time-consuming to assemble since the terminal rod has to be inserted through the nozzle holder. Although the grounding plate ensures good electric contact with the nozzle holder, it cannot be easily assembled in place or may be tilted when assembled, thus resulting in a laborious process of grounding the piezoelectric element. It has not been possible to insert preassembled pressure sensor parts into the nozzle holder. The prior timing sensor for detecting the electric resistance is also disadvantageous in that it is tedious and time-consuming to assemble the insulating plate and the contact plate and to draw the lead wire from the contact plate. The insulating plate and the contact plate cannot be inserted in preassembled condition in the nozzle holder.

SUMMARY OF THE INVENTION

It is an object of the present invention to provide a fuel injection nozzle having a timing sensor which can be preassembled and mounted in the nozzle holder with utmost ease.

Another object of the present invention is to provide a fuel injection nozzle having a timing sensor which can easily be grounded.

To achieve the above objects, there is provided according to the present invention a fuel injection nozzle including a nozzle holder having a spring chamber defined therein and housing a spring disposed therein, the nozzle holder having a hole defined therein in a direction transverse to an axis of the nozzle holder, the hole opening into the spring chamber, a needle valve movable axially with respect to the nozzle holder, the needle valve being normally urged by the spring to move toward a closed position, a spring seat disposed in the spring chamber remotely from the needle valve, the spring being seated on the spring seat to apply a force to the spring seat, means for supplying fuel through the nozzle holder to the needle valve to move the needle valve toward an open position against the force of the spring for thereby injecting the supplied fuel through the needle valve which is moved toward the open position, an insulating member fitted in the hole in a fluid-tight manner, and a conductive body extending through the insulating member in a fluid-tight manner and having an end positioned in the spring chamber between an inner wall surface of the nozzle holder and the spring seat. A pressure-sensitive element has an electrode surface fixed to a surface of the end of the conductive body and is responsive to the spring force applied thereto through the spring seat for producing an output signal which is fed out through the conductive body to thereby detect the timing of opening of the fuel injection nozzle. Alternatively, the electric resistance between the needle valve and the nozzle holder at the time the needle valve is closed and opened is detected through the conductive body to detect the timing of opening of the fuel injection nozzle.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
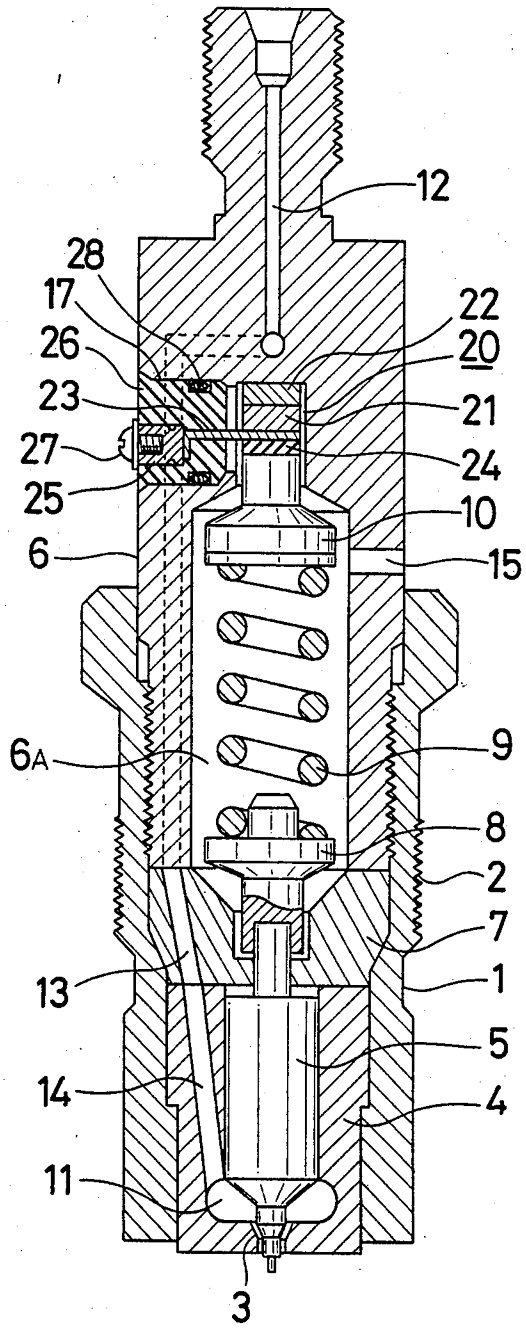
FIG. 1 is a cross-sectional view of a fuel injection nozzle with a timing sensor according to a first embodiment of the present invention.

Identical or corresponding parts are denoted by identical or corresponding reference characters throughout the views.

FIG. 1 shows in cross section a fuel injection nozzle having a timing sensor according to a first embodiment of the present invention. The fuel injection nozzle includes a nozzle nut 1 having on its outer circumferential surface an externally threaded portion 2 for being threaded in an engine head (not shown). A nozzle body 4 having a valve seat 3 therein is fitted in the nozzle nut 1. The fuel injection nozzle also has an axially movable needle valve 5 for coacting with the valve seat 3 to control the fuel injection port defined between the needle valve 5 and the valve seat 3.

A nozzle holder 6 is threaded in the nozzle nut 1. The nozzle body 4 is held in position in the nozzle nut 1 by the nozzle holder 6 with an intermediate member 7 interposed between the nozzle body 4 and the nozzle holder 6. A spring seat 8 is fitted over a rear end of the needle valve 5 and has an end extending into a spring chamber 6A defined in the nozzle holder 6. A coil spring 9 is disposed between the spring seat 8 and an opposite spring seat 10 for normally urging the spring seat 8 in the direction to lower the needle valve 5 in FIG. 1. The nozzle body 4 has a fuel reservoir 11 communicating with the fuel injection port. The nozzle holder 6 and the intermediate member 7 have fuel passage holes 12, 13 defined respectively therethrough and communicating with each other. The nozzle body 4 also has a fuel passage hole 14 providing fluid communication between the fuel reservoir 11 and the fuel passage hole 13. The pressure of fuel supplied from the fuel passage hole 12 into the fuel reservoir 11 is applied to the conical end surface of the needle valve 5 to move the needle valve 5 against the force of the spring 9 for injecting the fuel through the fuel injection port into the engine cylinder. The nozzle holder 6 also has a fuel passage hole 15 for returning fuel to a fuel tank (not shown) after the fuel has flowed between the nozzle body 4 and the needle valve 5 to lubricate the needle valve 5.

The nozzle nut 1, the nozzle body 4, the needle valve 5, the nozzle holder 6, the intermediate member 7, the spring seats 8 and 10, and the coil spring 9 are made of an electrically conductive material.

A timing sensor 20 is interposed between the spring seat 10 and the nozzle holder 6 for producing an output signal corresponding to a force applied by the spring seat 10 to the timing sensor 20. The sensor 20 is composed of a pressure-sensitive element 21 such as a piezoelectric element comprising a ceramic element, for example, a conductive body 22 held in contact with one surface of the piezoelectric element 21 to provide electric conduction between the piezoelectric element 21 and the nozzle holder 6, a conductive plate 23 held in contact with the opposite surface of the piezoelectric element 21 for connection thereof to an external terminal, the conductive plate 23 being made of phosphor bronze, for example, and an insulating plate 24 having one surface contacting an end face of the spring seat 10 for transmitting the force from the spring seat 10 to the piezoelectric element 21 through the conductive plate 23.

The piezoelectric element 21 and the conductive body 22 are bonded together, without impairing mutual electric contact, by a conductive adhesive coated on the contact surface of the piezoelectric element 21, for example. Likewise, the piezoelectric element 21 and the conductive plate 23 are bonded together by a conductive adhesive. The contact surfaces of the piezoelectric element 21 are coated by evaporation with layers of silver, for example, for an increased current collecting capability. The conductive plate 23 and the insulating plate 24 are bonded together by an adhesive. As a result, the piezoelectric element 21, the conductive body 22, the conductive plate 23, and the insulating plate 24 are of an integral construction.

The conductive plate 23 is electrically and mechanically connected to a lead-in conductive body 25 which serves as an extension of the conductive plate 23. The nozzle holder 6 has a hole 17 defined therein and extending in a direction substantially perpendicular to the longitudinal axis of the nozzle holder 6, the hole 17 opening into the spring chamber 6A. An insulating member 26 made of resin, for example, is fitted in the hole 17 in a fluid-tight manner. An oil seal such as an O-ring 28 is interposed between the insulating member 26 and the nozzle holder 6 to provide fluid-tight sealing therebetween. The conductive plate 23 and the lead-in conductive body 25 are partially embedded in the insulating member 26 in a fluid-tight manner, with the remainder of the lead-in conductive body 25 being exposed out of the insulating member 26. A screw 27 serving as a hot terminal is threaded into the lead-in conductive body 25 through its exposed portion.

Operation of the fuel injection nozzle shown in FIG. 1 is as follows: Fuel supplied from the inlet of the fuel passage hole 12 is introduced through the fuel passage holes 12, 13 and 14 into the fuel reservoir 11. The needle valve 5 is lifted in FIG. 1 under the pressure of the supplied fuel against the resiliency of the coil spring 9, thus allowing the fuel to be injected into the engine cylinder through the fuel injection port which is now opened between the valve seat 3 and the needle valve 5.

The piezoelectric element 21 generates an output signal dependent on the rate of change of the applied force. Therefore, the output signal dependent on the acceleration or deceleration of movement of the needle valve 5 is led through the conductive plate 23 and the conductive body 22 and issued via the lead-in conductive body 25 and the nozzle holder 6 as a voltage between the screw 27 and the ground, e.g., the nozzle holder 6. The output signal is then shaped in a waveform, and the timing of fuel injection can be detected by the rising edge of the shaped output signal.

The piezoelectric element 21, the conductive body 22, the conductive plate 23, and the insulating plate 24 are integral in construction, as described above, and this integral construction is also integral with the insulating member 26 and the lead-in conductive body 25 through the conductive plate 23. In assembly, therefore, the timing sensor 20 and the insulating member 26 integral therewith can be assembled together in the fuel injection nozzle by being inserted into the hole 17 in the direction substantially normal to the axis of the nozzle holder 6. The timing sensor 20 and the insulating member 26 can easily be inserted in position since the conductive plate 23 is made of a resilient material such as phosphor bronze, as described above.

The conductive plate 22 corresponds to the conventional grounding plate disclosed in the Japanese Laid-Open Publication No. 56-113044, for example. Since the conductive body 22 is pressed against the nozzle holder 6 under the spring force of the coil spring 9, good electric contact is ensured between the conductive body 22 and the nozzle holder 6. As a consequence, it is not necessary to increase the outside diameter of the conductive body 22 for electric contact of its peripheral edge with the wall surface of the spring chamber 6A. Inasmuch as the conductive body 22 is inserted as an integral part of the timing sensor 20, the conductive body 22 can easily be mounted in position without being tilted with respect to the nozzle holder 6.

Since the conductive plate 23 extends laterally in the nozzle holder 6 for drawing the signal from the timing sensor 20, the conductive plate 23 does not interfere positionally with the fuel passage hole 12 which supplies fuel from the upper end of the nozzle holder 6 in a conventional fuel injection nozzle.

The conductive body 22 and the piezoelectric element 21 need not necessarily be bonded to each other. With this alteration, the parts can be assembled by turning the nozzle holder 6 upside down in FIG. 1, inserting the conductive body 22 into the nozzle holder 6, and then inserting the timing sensor 20 other than the conductive body 22 into the nozzle holder 6.

A fuel injection nozzle with a timing sensor according to a second embodiment will be described with reference to FIG. 2. Those parts in FIG. 2 which are identical to the corresponding parts in FIG. 1 are denoted by identical reference characters in FIG. 1, and will not be described in detail.

A timing sensor 20A includes an annular piezoelectric element 21A. A conductive plate 23A has a hole defined in an inner end thereof, and an insulating plate 24A has a projection inserted through the hole in the conductive plate 23A. When the piezoelectric element 21A and the insulating plate 24A are assembled together, the projection of the insulating plate 24A is fitted into the central hole of the piezoelectric element 21A with the conductive plate 23A sandwiched therebetween.

One surface of the piezoelectric element 21A and the conductive body 22 are bonded together by a conductive adhesive, and the opposite surface of the piezoelectric element 21A and the conductive plate 23A are also bonded together by a conductive adhesive. The conductive plate 23A and the insulating plate 24A are bonded together by an adhesive. The conductive body 22, the piezoelectric element 21A, the conductive plate 23A, and the insulating plate 24A are therefore integral in construction. The other structural details are the same as those of the first embodiment.

Operation of the timing sensor according to the second embodiment for detecting fuel injection timing is the same as that of the timing sensor of the first embodiment. The timing sensor 20A can be inserted and assembled in the fuel injection nozzle in the same manner as with the first embodiment, and the conductive plate 23A for drawing out the output signal from the timing sensor 20A does not present a positional obstacle to the fuel passage hole 12.

Where the projection of the insulating plate 24A is so sized that the projection is force-fitted into the hole in the piezoelectric element 21A to guard against their separation, with the conductive plate 23A held therebetween, no adhesive bonding is required between the piezoelectric element 21A and the conductive plate 23A and also between the conductive plate 23A and the insulating plate 24A.

As with the first embodiment, the conductive body 22 and the piezoelectric element 21A need not necessarily be bonded to each other. With this alternative, the parts can be assembled by inverting the nozzle holder 6 in FIG. 2, inserting the conductive body 22 into the nozzle holder 6, in which case then inserting the timing sensor 20A other than the conductive body 22 into the nozzle holder 6.

Figure 2:
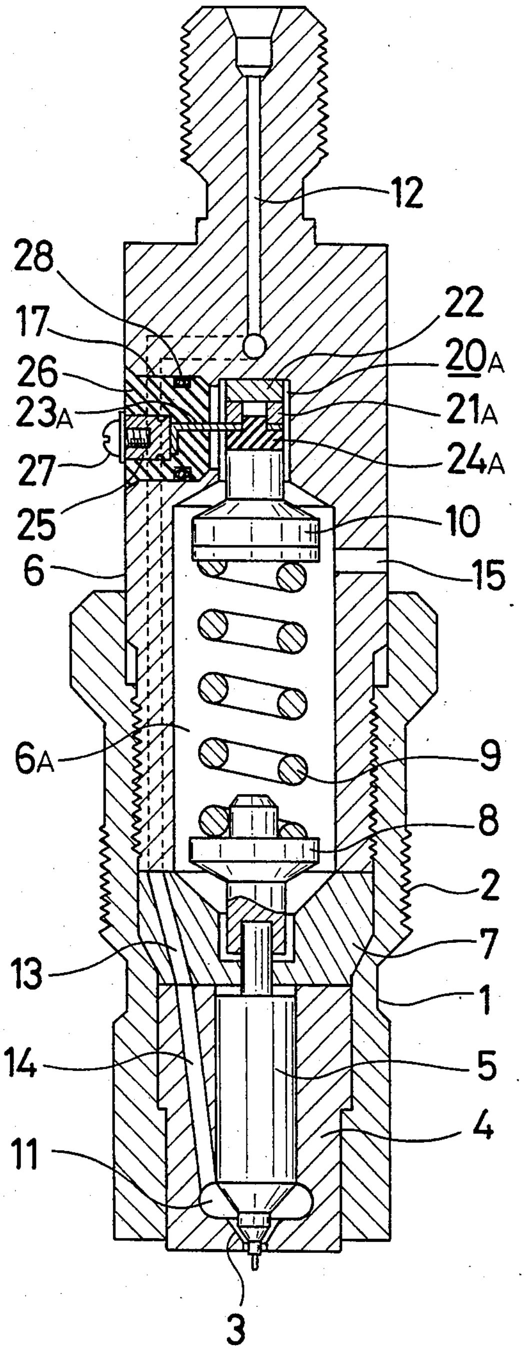
FIG. 2 is a cross-sectional view of a fuel injection nozzle with a timing sensor according to a second embodiment of the present invention.
Figure 3:
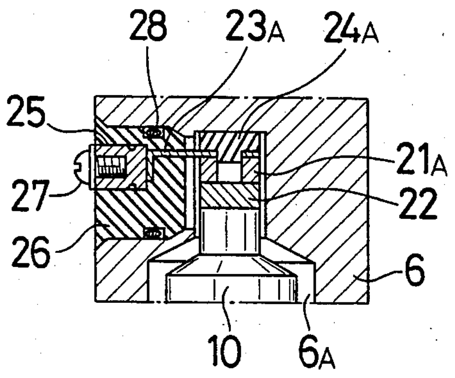
FIG. 3 is a fragmentary cross-sectional view of a modification of the second embodiment.

FIG. 3 shows a modification of the timing sensor according to the second embodiment shown in FIG. 2. As illustrated in FIG. 3, the timing sensor 20A is inverted such that the conductive body 22 is held in contact with the spring seat 10, and the insulating plate 24A is held in contact with the nozzle holder 6.

Operation of the modified timing sensor of FIG. 3 is the same as that of the timing sensor shown in FIG. 2.

The piezoelectric element 21 or 21A in the first and second embodiments and the modification of the second embodiment may be replaced with an element of pressure-sensitive conductive polymer or pressure-sensitive conductive rubber, or a nonlinear passive element. The conductive plate 23 and the leading conductive body 25 may be of an integral construction.

Figure 5:
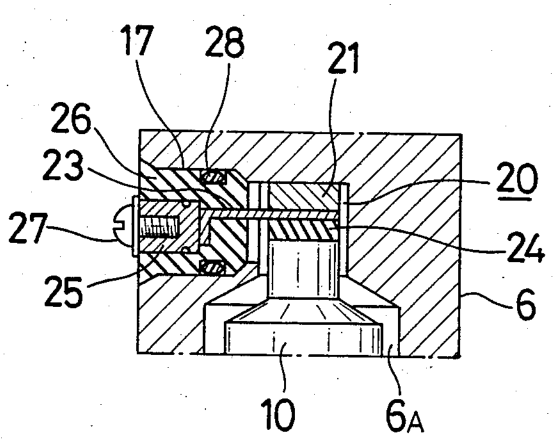
FIG. 5 is a fragmentary cross-sectional view of a modified timing sensor according to the present invention.

In the first and second embodiments, the spring seat 10 may be formed of an insulating material such as polyphenylene sulfide (PPS) containing glass fibers, and hence the insulating plate 24 or 24A may be dispensed with. The conductive body 22 may be dispensed with as shown in FIG. 5, and one of the electrode surfaces of the piezoelectric element 21 or 21A is held in direct contact with the nozzle holder 6.

Figure 4:
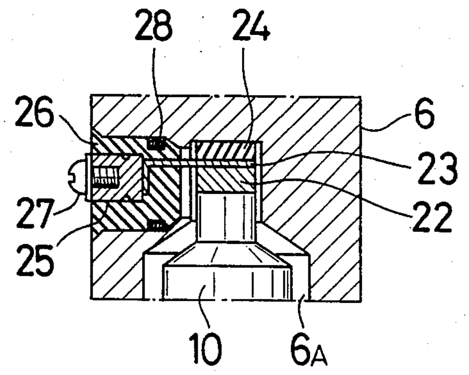
FIG. 4 is a fragmentary cross-sectional view of a timing sensor according to a third embodiment of the present invention.

A timing sensor according to a third embodiment will be described with reference to FIG. 4.

The timing sensor of the third embodiment detects the timing of fuel injection by detecting different electric resistances between the needle valve 5 and the nozzle holder 6 at the time the needle valve 5 is opened and closed.

In the third embodiment, the piezoelectric element 21 of the first embodiment is not employed, but the conductive body 22 is electrically coupled and bonded to one surface of the conductive plate 23 and the insulating plate 24 is bonded to the opposite surface of the conductive plate 23. The conductive body 22, the conductive plate 23, and the insulating plate 24 are interposed between the spring seat 10 and the nozzle holder 6 with the conductive body 22 held against the spring seat 10, and the insulating plate 24 held against the nozzle holder 6. The other structural details are the same as those of the first embodiment.

In operation, when the needle valve 5 is opened and closed, electric switching is effected between the needle valve 5 and the nozzle body 4. More specifically, when the needle valve 5 is closed, the fuel film between the needle valve 5 and the nozzle body 4 is broken by the contact surfaces of the needle valve 5 and the nozzle body 4, which are then electrically conducted. When the needle valve 5 is open, fuel is present between the needle valve 5 and the nozzle body 4 to increase the electric resistance between the needle valve 5 and the nozzle body 4. Therefore, when the needle valve 5 is opened and closed, the electric resistance between the lead-in conductive body 25 and the nozzle holder 6 is different. The timing of lifting movement of the needle valve 5 can be detected by measuring the electric resistance between the lead-in conductive body 25 and the nozzle holder 6.

In the third embodiment, the conductive body 22 and the insulating plate 24 may be bonded to the conductive plate 23 so that they may be inserted in the preassembled condition into the nozzle holder 6 in the direction normal to the axis thereof. Therefore, the conductive body 22, the conductive plate 23, and the insulating plate 24 can easily be assembled into the fuel injection nozzle.

With the arrangement of the present invention, the timing sensor coupled to the conductive body for obtaining a timing signal indicative of a lifting movement of the needle valve can be inserted into the nozzle holder in the direction substantially perpendicular to the axis thereof. The timing sensor can therefore be assembled easily into the fuel injection nozzle with an increased degree of efficiency. The timing sensor can easily be grounded, and the grounding member will not be mounted in an undesired tilted position. The conductive body for extracting the timing signal does not present a positional obstacle to the fuel passage hole which supplies fuel from the top of the hozzle holder. Therefore, fuel can be supplied from the top of the nozzle holder in the conventional manner.

Although certain preferred embodiments have been shown and described, it should be understood that many changes and modifications may be made therein without departing from the scope of the appended claims.

What is claimed is:

1. A fuel injection nozzle comprising:

(a) a nozzle holder having a spring chamber therein extending in the direction of the longitudinal axis of said nozzle holder and having a spring therein, said nozzle holder further having a hole therein extending in a direction transverse to said longitudinal axis, said hole opening into said spring chamber;

(b) a needle valve movable relative to said nozzle holder and in the direction of said longitudinal axis, said needle valve normally being urged by said spring to move toward a closed position;

(c) a spring seat in said spring chamber remote from said needle valve, said spring being seated on said spring seat for applying a force to said spring seat;

(d) means for supplying fuel through said nozzle holder to said needle valve and acting on said needle valve to move said needle valve toward an open position against the force of said spring for thereby injecting the supplied fuel through said needle valve which has been moved toward the open position; and (e) a timing sensor means in said nozzle holder and having:

(1) an insulating member insertable into said hole in said transverse direction from outside said nozzle holder and fitted in a fluid-tight manner in said hole;

(2) a conductive plate extending through said insulating member and held therein in a fluid-tight manner and having an end extending in said transverse direction and positioned in said spring chamber between an inner end wall of said spring chamber and said spring seat;

(3) a pressure sensitive element having one electrode surface fixed to one surface of said end of said conductive plate and held in electrically conductive relation to said conductive plate, said pressure sensitive element being positioned in said spring chamber when said insulating member is fitted in said hole, said pressure sensitive element, the end of said conductive plate and said spring seat being aligned in the direction of said longitudinal axis for causing said pressure sensitive element to be subjected to the force of said spring through said spring seat, said pressure sensitive element having an opposite electrode surface held against said inner end wall in electrically conductive relation thereto, said end of said conductive plate having a surface opposite to said one surface electrically insulated from said nozzle holder; and (4) an insulating plate fixed to the surface of the end of said conductive plate opposite said one surface for receiving the force of the spring through said spring seat, whereby said pressure sensitive element will produce an output signal in response to movement of said needle valve to the open position to detect the timing of fuel injection, and said timing sensor means can be inserted transversely into said nozzle holder from outside the fuel injection nozzle for assembly thereof into the fuel injection nozzle.

2. A fuel injection nozzle comprising:

(a) a nozzle holder having a spring chamber therein extending in the direction of the longitudinal axis of said nozzle holder and having a spring therein, said nozzle holder further having a hole therein extending in a direction transverse to said longitudinal axis, said hole opening into said spring chamber;

(b) a needle valve movable relative to said nozzle holder and in the direction of said longitudinal axis, said needle valve normally being urged by said spring to move toward a closed position;

(c) a spring seat in said spring chamber remote from said needle valve, said spring being seated on said spring seat for applying a force to said spring seat;

(d) means for supplying fuel through said nozzle holder to said needle valve and acting on said needle valve to move said needle valve toward an open position against the force of said spring for thereby injecting the supplied fuel through said needle valve which has been moved toward the open position; and (e) a timing sensor means in said nozzle holder and having:

(1) an insulating member insertable into said hole in said transverse direction from outside said nozzle holder and fitted in a fluid-tight manner in said hole;

(2) a conductive plate extending through said insulating member and held therein in a fluid-tight manner and having an end extending in said transverse direction and positioned in said spring chamber between an inner end wall of said spring chamber and said spring seat;

(3) a pressure sensitive element having one electrode surface fixed to one surface of said end of said conductive plate and held in electrically conductive relation to said conductive plate, said pressure sensitive element being positioned in said spring chamber when said insulating member is fitted in said hole, said pressure sensitive element, the end of said conductive plate and said spring seat being aligned in the direction of said longitudinal axis for causing said pressure sensitive element to be subjected to the force of said spring through said spring seat, said pressure sensitive element having an opposite electrode surface in electrically conductive relation with said nozzle holder, said end of said conductive plate having a surface opposite to said one surface electrically insulated from said nozzle holder; and (4) a conductive body fixed to said opposite electrode surface of said pressure sensitive element in electrically conductive relation thereto, said conductive body being held against said inner end wall in electrically conductive relation thereto, and an insulating plate fixed to the surface of the end of said conductive plate opposite said one surface for receiving the force of the spring through said spring seat, whereby said pressure sensitive element will produce an output signal in response to movement of said needle valve to the open position to detect the timing of fuel injection, and said timing sensor means can be inserted transversely into said nozzle holder from outside the fuel injection nozzle for assembly thereof into the fuel injection nozzle.

3. A fuel injection nozzle according to claim 2 in which said pressure sensitive element has an annular shape having a central hole, said conductive plate has a through hole in said end, and said insulating plate has a projection extending through said through hole and force fitted in said central hole of said pressure sensitive element for fixing said one electrode surface of said pressure sensitive element to said one surface of the end of said conductive plate and also to fix said opposite surface of the end of said conductive plate to said insulating plate.

4. A fuel injection nozzle comprising:

(a) a nozzle holder having a spring chamber therein extending in the direction of the longitudinal axis of said nozzle holder and having a spring therein, said nozzle holder further having a hole therein extending in a direction transverse to said longitudinal axis, said hole opening into said spring chamber;

(b) a needle valve movable relative to said nozzle holder and in the direction of said longitudinal axis, said needle valve normally being urged by said spring to move toward a closed position;

(c) a spring seat in said spring chamber remote from said needle valve, said spring being seated on said spring seat for applying a force to said spring seat;

(d) means for supplying fuel through said nozzle holder to said needle valve and acting on said needle valve to move said needle valve toward an open position against the force of said spring for thereby injecting the supplied fuel through said needle valve which has been moved toward the open position; and (e) a timing sensor means in said nozzle holder and having:

(1) an insulating member insertable into said hole in said transverse direction from outside said nozzle holder and fitted in a fluid-tight manner in said hole;

(2) a conductive plate extending through said insulating member and held therein in a fluid-tight manner and having an end extending in said transverse direction and positioned in said spring chamber between an inner end wall of said spring chamber and said spring seat;

(3) a pressure sensitive element having one electrode surface fixed to one surface of said end of said conductive plate and held in electrically conductive relation to said conductive plate, said pressure sensitive element being positioned in said spring chamber when said insulating member is fitted in said hole, said pressure sensitive element, the end of said conductive plate and said spring seat being aligned in the direction of said longitudinal axis for causing said pressure sensitive element to be subjected to the force of said spring through said spring seat, said pressure sensitive element having an opposite electrode surface in electrically conductive relation with said nozzle holder, said end of said conductive plate having a surface opposite to said one surface electrically insulated from said nozzle holder; and (4) an insulating plate fixed to the surface of the end of said conductive plate opposite said one surface, said insulating plate being held against said inner end wall, said opposite electrode surface of said pressure sensitive element being in electrically conductive relation to said spring seat for receiving the force of the spring through said spring seat, said pressure sensitive element having an annular shape having a central hole, said conductive plate having a through hole in said end, said insulating plate having a projection extending through said through hole in said conductive plate and being force fitted in said central hole of said pressure sensitive element to fix said one electrode surface of said pressure sensitive element to said one surface of the end of said conductive plate and also to fix said opposite surface of the end of said conductive plate to said insulating plate, whereby said pressure sensitive element will produce an output signal in response to movement of said needle valve to the open position to detect the timing of fuel injection, and said timing sensor means can be inserted transversely into said nozzle holder from outside the fuel injection nozzle for assembly thereof into the fuel injection nozzle.

* * * * *